US012572855B1

(12) United States Patent
Shapiro et al.

(10) Patent No.: US 12,572,855 B1
(45) Date of Patent: Mar. 10, 2026

(54) SYSTEMS AND METHODS FOR REFINING MACHINE LEARNING MODELS BASED ON USER RESPONSES TO PROMPTS

(71) Applicants: Dmitry Shapiro, Spring Valley, CA (US); Sean Edward Thielen, New York, NY (US)

(72) Inventors: Dmitry Shapiro, Spring Valley, CA (US); Sean Edward Thielen, New York, NY (US)

( * ) Notice: Subject to any disclaimer, the term of this patent is extended or adjusted under 35 U.S.C. 154(b) by 0 days.

(21) Appl. No.: 18/457,255

(22) Filed: Aug. 28, 2023

(51) Int. Cl.
*G06N 20/00* (2019.01)
(52) U.S. Cl.
CPC .................................... *G06N 20/00* (2019.01)
(58) Field of Classification Search
CPC ..................................................... G06N 20/00
See application file for complete search history.

(56) References Cited

U.S. PATENT DOCUMENTS

| | | | |
|---|---|---|---|
| 10,978,090 B2 | 4/2021 | Binder | |
| 11,681,505 B2 | 6/2023 | Mukherjee | |
| 2016/0342317 A1* | 11/2016 | Lim | G10L 15/1822 |
| 2020/0184065 A1* | 6/2020 | Toth | G06N 20/00 |
| 2021/0232374 A1 | 7/2021 | Weibel | |
| 2023/0094646 A1 | 3/2023 | Sanjay | |
| 2023/0245651 A1 | 8/2023 | Wang | |
| 2023/0252224 A1 | 8/2023 | Tran | |
| 2023/0252233 A1 | 8/2023 | Gutierrez | |

| | | |
|---|---|---|
| 2023/0259705 A1 | 8/2023 | Tunstall-Pedoe |
| 2023/0273958 A1 | 8/2023 | Laliberte |
| 2023/0273959 A1 | 8/2023 | Laliberte |
| 2023/0274086 A1 | 8/2023 | Tunstall-Pedoe |
| 2023/0274089 A1 | 8/2023 | Tunstall-Pedoe |
| 2023/0274094 A1 | 8/2023 | Tunstall-Pedoe |
| 2023/0281249 A1 | 9/2023 | Laliberte |
| 2023/0316006 A1 | 10/2023 | William |
| 2023/0325590 A1 | 10/2023 | Shevchenko |
| 2023/0341950 A1 | 10/2023 | Taylor |
| 2023/0385085 A1 | 11/2023 | Singh |

(Continued)

OTHER PUBLICATIONS

Ouyang, Long, et al. "Training language models to follow instructions with human feedback." Advances in Neural Information Processing Systems 35 (2022): 27730-27744. (Year: 2022).*

(Continued)

*Primary Examiner* — Kevin W Figueroa
(74) *Attorney, Agent, or Firm* — Esplin & Associates, PC

(57) ABSTRACT

Systems and methods for refining machine learning models based on user responses to prompts. Exemplary implementations may: store response records for individual users that include responses by individual ones of the users to prompts; provide supplemental prompts to a first user; receive user input from the first user indication responses to the supplemental prompts; obtain the first response record for the first user from storage; for the first user, refine a first machine learning model based on responses by the first user to the supplemental prompts and the first response record, refining includes training the first machine learning model to customize outputs generated by the model for the first user; provide the refined machine learning model for use by the first user; and/or other exemplary implementations.

18 Claims, 7 Drawing Sheets

(56)         References Cited

U.S. PATENT DOCUMENTS

| | | |
|---|---|---|
| 2023/0393870 A1 | 12/2023 | Singh |
| 2025/0117193 A1 | 4/2025 | Dmitry |

OTHER PUBLICATIONS

Pook, Stuart. "Interaction and Context in Zoomable User Interfaces." École Nationale Supérieure des Télécommunications. Paris, France (2001). (Year: 2001).*

Bai, Yuntao, et al. "Training a helpful and harmless assistant with reinforcement learning from human feedback." arXiv preprint arXiv:2204.05862 (2022). (Year: 2022).*

Madaan, Aman, et al. "Self-refine: Iterative refinement with self-feedback." Advances in Neural Information Processing Systems 36 (2023): 46534-46594. (Year: 2023).*

Anonymous, User Interface and Application Programming Interface for Explaining Personalized Machine-Learned Model Outputs, Jan. 3, 2018, IP.com, pp. 1-34. Retrieved from the Internet: <URL https://priorart.ip.com/IPCOM/000252271:>. (Year: 2018).

* cited by examiner

SYSTEMS AND METHODS FOR REFINING MACHINE LEARNING MODELS BASED ON USER RESPONSES TO PROMPTS

FIELD OF THE DISCLOSURE

The present disclosure relates to systems and methods for refining machine learning models based on user responses to prompts.

BACKGROUND

Large language models for text summarization and text generation are known. Chatbots, virtual assistants, conversational AI, and other types of interactive language models are known.

SUMMARY

Machine learning may be utilized to perform and optimize an endless number of tasks. Recently, large language models for generating content have become a popular application of machine learning. One downfall of these models is a lack of personalization and customization. For example, a model configured to summarize news articles will output the same summary regardless of the user that requested the summary. A summary generated for a college professor should be different than a summary of the same article generated for a high schooler. Different users of different ages, backgrounds, educations, and other characteristics may be better served by models capable of factoring in these characteristics and generating personalized output. One or more aspects of the present disclosure include a system for refining machine learning models based on user responses to prompts. The system may include electronic storage, one or more hardware processors configured by machine-readable instructions, and/or other components. Executing the machine-readable instructions may cause the one or more hardware processors to facilitate refining machine learning models based on user responses to prompts. The machine-readable instructions may include one or more computer program components. The one or more computer program components may include one or more of a prompt component, a record component, a model component, and/or other components.

The electronic storage may store response records for individual users. Response records for individual ones of the users may include responses by individual ones of the users to prompts. Prompts may be provided via one or more user interfaces of client computing platforms associated with individual ones of the users. By way of non-limiting illustration, the response records may include a first response record for a first user. The first response record may include responses provided by the first user to prompts.

The prompt component may be configured to provide supplemental prompts to the first user. The supplemental prompts may be provided on a user interface of a client computing platform associated with the first user. The supplemental prompts may include a first supplemental prompt that is presented to the first user.

The prompt component may be configured to receive user input from the first user indicating responses to the supplemental prompts. The user input may indicate a first response to the first supplemental prompt.

The record component may be configured to obtain the first response record for the first user from storage.

The model component may be configured to, for the first user, refine a first machine learning model based on response(s) by the first user to the supplemental prompts and/or the first response record. Refining the first machine learning model may include training the first machine learning model to customize outputs generated by the model for the first user.

The model component may be configured to provide the refined machine learning model for use by the first user.

As used herein, any association (or relation, or reflection, or indication, or correspondency) involving servers, processors, client computing platforms, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

These and other features, and characteristics of the present technology, as well as the methods of operation and functions of the related elements of structure and the combination of parts will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1:
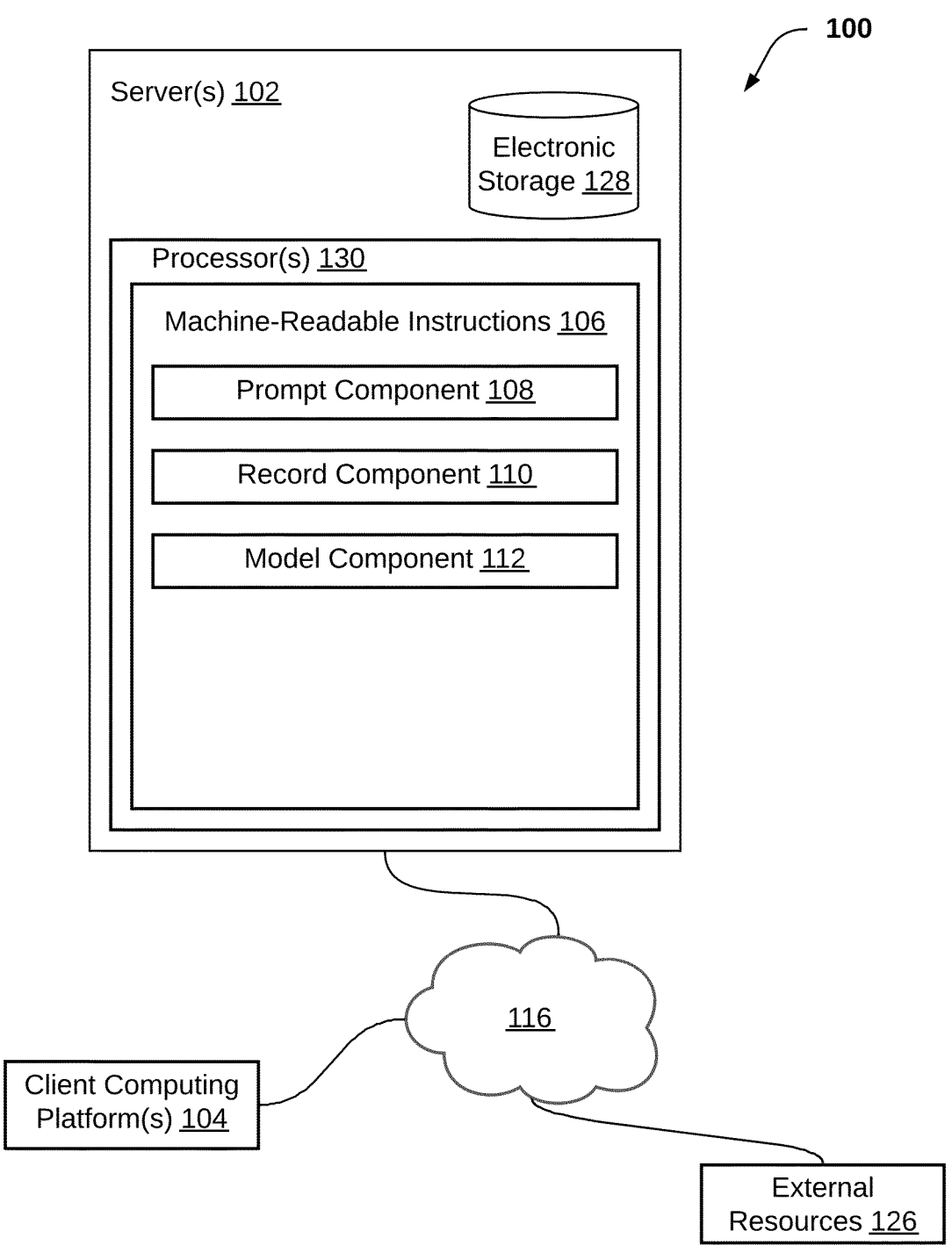
FIG. 1 illustrates a system for refining machine learning models based on user responses to prompts, in accordance with one or more implementations.

FIG. 1 illustrates a system 100 configured for refining machine learning models based on user responses to prompts, in accordance with one or more implementations. In some implementations, system 100 may include one or more server(s) 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may be configured by machine-readable instructions 106. Executing the machine-readable instructions 106 may cause server(s) 102 to facilitate refining machine learning models based on user responses to prompts. Machine-readable instructions 106 may include one or more instruction components. The instruction components may include computer program components. The instruction components may include one or more of prompt component 108, record component 110, model component 112, and/or other instruction components.

Electronic storage 128 may store and/or maintain response records for individual users. Individual response records for individual ones of the users may include responses by individual ones of the users to prompts and/or other information. By way of non-limiting illustration, the response records may include a first response record for a first user. The first response record may include responses provided by the first user to prompts. In some implementations, the first response record and/or the first user may be identifiable by a unique identifier (UID). The UID associated with the first user may facilitate identification of the first response record as corresponding with the first user. In some implementations, the unique identifier associated with the first user may facilitate identification and/or updates to the first response record responsive to detection of responses by the first user to one or more provided prompts. In some implementations, the UID associated with the first user may be generated responsive to creation of a user account by the first user. Creation of a user account by the first user may generate user account information for the first user. Electronic storage 128 may store user account information associated individual ones of the users. User account information associated with an individual user may include a UID associated with the individual user and/or a response record for the individual user. In some implementations, user account information may include identification information (e.g., name, birthday, email address, etc.), demographic information (e.g., age, race, gender, income, education, employment, etc.), and/or other information.

Responses included in the first response record may include text, image, audio, video, sensor data, and/or other types of content. The content included in the stored responses may include content selected and/or entered by the first user in response to one or more provided prompts. By way of non-limiting illustration, a prompt provided to the first user via a client computing platform 104 associated with the first user may be a question (e.g., "Which interior design style do you prefer?"), statement (e.g., "Choose your preferred interior design style."), and/or other type of prompt. A user interface of the client computing platform 102 may display one or more images and/or other content corresponding to the provided prompt (e.g., two or more images depicting different interior design styles), and/or other user interface elements. In some implementations, the one or more images and/or other content may be displayed simultaneously with the prompt. A response by the first user to the prompt may include selection of an image. The selected image may be stored in the first response record. In some implementations, the selected image may be stored in conjunction with the prompt. Responses within individual response records may be stored in an unstructured format, semi-structured format, and/or other data formats. By way of non-limiting illustration, a response record having an unstructured format may store responses in one or more files without an organizational schema. A response record having a semi-structured format may store responses in a tree-like structure, graph structure, and/or other data structures. In some implementations, response records and/or responses for individual ones of the users may be obtained (e.g., from external resource(s) 126 via network(s) 116) and/or imported by the individual users (e.g., via client computing platform(s) 104).

Prompt component 108 may be configured to provide one or more supplemental prompts to the first user and/or other users. The supplemental prompts may be provided on a user interface of a client computing platform 104 associated with the first user. The supplemental prompts may include a first supplemental prompt that is presented to the first user. The first supplemental prompt may be a question, statement, interactive activity, and/or other type of prompt. By way of non-limiting illustration, an interactive activity prompt may include a series of mathematical equations. A response by the first user to the interactive activity prompt may include one or more answers to the mathematical equations. Prompt component 108 may be configured to obtain response(s) by the user to the interactive activity prompt and determine response information for the obtained response(s). By way of non-limiting illustration, response information may include a response time, response accuracy, and/or other information pertaining to the obtained response(s). Response time, for an individual response, may specify an amount of time between a mathematical equation being presented to the first user and submission, by the first user, of an answer for the mathematical equation. Response accuracy may specify whether the answer submitted by the first user is the correct answer to the presented mathematical equation. In some implementations, response(s) by the first user to supplemental prompt(s) may be stored in the first response record. By way of non-limiting illustration, the first response record may include the obtained response(s) to the interactive activity prompt, response information for the obtained response(s), and/or other information.

In some implementations, prompt component 108 may be configured to determine values of attributes for individual ones of the users. Attributes may include traits, characteristics, preferences, and/or other aspects of the first user. The determination of values of attributes may be based on the response records for individual ones of the users. By way of non-limiting illustration, a first attribute may be interest in international politics. Based on the first response record for the first user, prompt component 108 may determine a first value for the first attribute. The first value for the first attribute may be low interest, moderate interest, high interest, and/or other values. The first value for the first attribute may be a numerical value (e.g., a score out of 100, percentage, etc.). The first value for the first attribute may be based on a comparison between the first response record and one or more other response records for other individual users. Values of attributes for individual ones of the users may be stored in the response records for individual ones of the users and/or included in user account information associated with individual ones of the users.

In some implementations, prompt component 108 may generate supplemental prompts based on the first response record, user account information associated with the first user, and/or other information. Generating supplemental prompts may include analyzing the first response record and/or user account information for the first user to identify one or more indeterminate attributes for the first user. In some implementations, the indeterminate attributes may be identified responsive to the first response record including a number of responses associated with the indeterminate attribute being at or below a threshold. In some implementations, the indeterminate attributes may be identified responsive to the first response record and/or user account information associated with the first users lacking values for the indeterminate attributes. By way of non-limiting illustration, a first attribute may be identified responsive to the first response record having an insufficient number of responses associated with the identified attribute. An insufficient number of responses may indicate an inability to determine a value of the first attribute for the first user and/or the first user lacking a value for the first attribute. Prompt component 108 may be configured to generate and/or provide supplemental prompts associated with the indeterminate attributes. Responses by the first user to the supplemental prompts may facilitate the determination of values of the indeterminate attributes for the first user.

Prompt component 108 may be configured to receive user input from the first user indicating one or more responses to the supplemental prompts. The user input may indicate a first response to the first supplemental prompt. User input may be provided via the client computing platform 104 associated with the first user. A user interface of the client computing platform 104 associated with the first user may display the first supplemental prompt, one or more selectable response options, and/or other features. User input may indicate selection of one of the selectable response options by the first user. The first response to the first supplemental prompt may be the same as the selectable response option selected by the first user. In some implementations, the first response to the first supplemental prompt may be stored and/or included in the first response record for the first user.

In some implementations, prompt component 108 may be configured to present a selection interface to the first user. The selection interface may be presented via the client computing platform 104 associated with the first user. In some implementations, individual ones of the users may access the selection interface subsequent to creating a user account and/or generating user account information. The selection interface may include one or more selectable interface elements corresponding to individual applications and/or other user interface elements. Individual ones of the applications may utilize one or more models to perform application functions. By way of non-limiting illustration, prompt component 108 may be configured to receive, via user input from the first user, selection of a first application that utilizes a first machine learning model. Subsequent to selection of an application from the selection interface, the user may be shown an interface presenting one or more prompts (e.g., supplemental prompts). By way of non-limiting illustration, supplemental prompts may be provided to the first user responsive to selection of the first application. Selection of the first application may facilitate user of the first application by the first user. The supplemental prompts provided to the first user may be associated with the first application.

In some implementations, individual applications corresponding to the selectable interface elements may be generated and/or customized by individual developing users. Individual developing users may customize the individual applications. Customizing the individual applications may include selecting the one or more models to perform application functions. In some implementations, customizing the individual applications may include selecting and/or creating one or more supplemental prompts associated with the individual applications. Supplemental prompts associated with an individual application may be presented subsequent and/or responsive to selection of an interface element corresponding with the individual application (e.g., from the selection interface). In some implementations, customizing an individual application may include selecting one or more attributes for refining the one or more models that perform the application functions. Prompt component 108 may be configured to generate supplemental prompts based on the one or more selected attributes. The generated supplemental prompts may elicit user responses that facilitate the determination of values of the one or more selected attributes for the responding users.

Record component 110 may be configured to obtain the first response record for the first user and/or other response records. The first response record and/or other response records may be obtained from electronic storage 128. The first response record may be obtained responsive to selection of the first application and/or response(s) by the first user to the supplemental prompts associated with the first application.

Model component 112 may be configured to, for the first user, refine a first machine learning model based on response(s) by the first user to the supplemental prompts, the first response record, and/or other information. Refining the first machine learning model may include training and/or retraining the first machine learning model to customize outputs generated by the model for the first user. By way of non-limiting illustration, customized outputs may be tailored for the first user based on the interests, preferences, background (e.g., education, age, etc.), and/or other characteristics of the first user.

In some implementations, model component 112 may be configured to, for individual users, refine one or more models associated with the selected application (e.g. from the selection interface). In some implementations, the first machine learning model may be a publicly available model (e.g., GPT-3, GPT-3.5, GPT-4, Claude-v1, Claude-v2, Claude Instant, etc.) or a private model. Publicly available models may be obtained from external resources 126 via network(s) 116 and/or other sources. Private models may be uploaded by developing users (e.g., via client computing platform(s) 104), obtained from electronic storage 128, and/or other sources.

In some implementations, refining the first machine learning model may include training the first machine learning model on training information and/or other information. The training information may include the responses by the first user to the supplemental prompts, the first response record, and/or other information. In some implementations, the machine learning model may utilize one or more of an artificial neural network, naïve bayes classifier algorithm, k means clustering algorithm, support vector machine algorithm, linear regression, logistic regression, decision trees, random forest, nearest neighbors, and/or other approaches. Model component 112 may utilize training techniques such as supervised learning, semi-supervised learning, unsupervised learning, reinforcement learning, and/or other techniques.

In supervised learning, the model may be provided with known training dataset that includes desired inputs and outputs (e.g., the input/output pairs described herein), and the model may be configured to find a method to determine how to arrive at those outputs based on the inputs. The model may identify patterns in data, learn from observations, and make predictions. The model may make predictions and may be corrected by an operator—this process may continue until the model achieves a high level of accuracy/performance. Supervised learning may utilize approaches including one or more of classification, regression, and/or forecasting.

Semi-supervised learning may be similar to supervised learning, but instead uses both labelled and unlabeled data. Labelled data may comprise information that has meaningful tags so that the model can understand the data (e.g., the input/output pairs described herein), while unlabeled data may lack that information. By using this combination, the machine learning model may learn to label unlabeled data.

For unsupervised learning, the machine learning model may study data to identify patterns. There may be no answer key or human operator to provide instruction. Instead, the model may determine the correlations and relationships by analyzing available data. In an unsupervised learning process, the machine learning model may be left to interpret large data sets and address that data accordingly. The model tries to organize that data in some way to describe its structure. This might mean grouping the data into clusters or arranging it in a way that looks more organized. Unsupervised learning may use techniques such as clustering and/or dimension reduction.

Reinforcement learning may focus on regimented learning processes, where the machine learning model may be provided with a set of actions, parameters, and/or end values. By defining the rules, the machine learning model then tries to explore different options and possibilities, monitoring and evaluating each result to determine which one is optimal to generate correspondences. Reinforcement learning teaches the model trial and error. The model may learn from past experiences and adapt its approach in response to the situation to achieve the best possible result.

In some implementations, refining the first machine learning model may include modifying a context window corresponding to the first machine learning model. Modifying the content window may include modifying the size of inputs capable of being processed by the first machine learning model. In some implementations, refining the first machine learning model may include modifying and/or filtering one or more outputs generated by the first machine learning model. By way of non-limiting illustration, model component 112 may be configured to generate and/or a modify an output layer of the first machine learning model based on response(s) by the first user to the supplemental prompts, the first response record, and/or other information.

Model component 112 may be configured to provide the refined machine learning model for use by the first user. In some implementations, providing the refined machine learning model may include presenting an interactive display that facilitates use of the refined machine learning model by the first user. In some implementations, the refined machine learning model may be stored in electronic storage 128. The refined machine learning model may be stored in connection with the first user and/or the first response record.

In some implementations, prompt component 108 may be configured to present a scrollable feed to a given user on a user interface of a client computing platform associated with the given user. The scrollable feed may present individual displays of a series of displays. Individual displays may include individual prompts and/or other information. In some implementations, the scrollable feed may present one display at a time and/or one prompt at a time. The scrollable feed may be infinitely scrollable, or the scrollable feed may terminate responsive to the given user being presented all the displays of the series of displays.

In some implementations, a series of displays may correspond with a set of prompts. Individual sets of prompts may include one or more prompts to provide to individual ones of the users. Individual prompts of a set of prompts may be provided to ascertain specific user characteristics, attributes, and/or other information. By way of non-limiting illustration, user response(s) to one or more prompts of a given set of prompts may facilitate determination of the user's interest in international politics. In some implementations, individual sets of prompts may be provided to individual ones of the users based on user demographic information that describes the users. By way of non-limiting illustration, a first set of prompts may be provided to female users between the ages of 35-40, a second set of prompts may be provided to male users between the ages of 65-75. Prompts of the first set of prompts may be separate and distinct from prompts of the second set of prompts. In some implementations, the first set of prompts and the second set of prompts may include one, two, and/or other numbers of the same prompts. An individual user may be provided with one or more sets of prompts on the scrollable feed.

User input may facilitate presentation of a subsequent display within the series of displays. User input may include tapping, double tapping, swiping, sliding, and/or other user gestures. In some implementations, user input indicating response to a first prompt may facilitate presentation of a second display including a second prompt. In some implementations, user input indicating no response to the first prompt (e.g., swiping past the first prompt) may facilitate presentation of a second display including the second prompt.

By way of non-limiting illustration, a first display including a first prompt may be presented to the given user. Responsive to user input, a second display including a second prompt may presented to the given user. Prompt component 108 may be configured to obtain, based on user input via the client computing platform(s) 104 associated with the given user, user responses to the prompts included in the individual displays presented on the scrollable feed. Record component 110 may be configured to aggregate the obtained user responses by the given user to generate a response record for the given user. Record component 110 may be configured to store the response record for the given user in electronic storage 128. In some implementations, record component 110 may be configured to update a response record for the given user, responsive to receipt of additional user responses by the given user to the prompts included in the individual displays of the scrollable feed. The response record for the given user may be stored in electronic storage 128.

Figure 3:
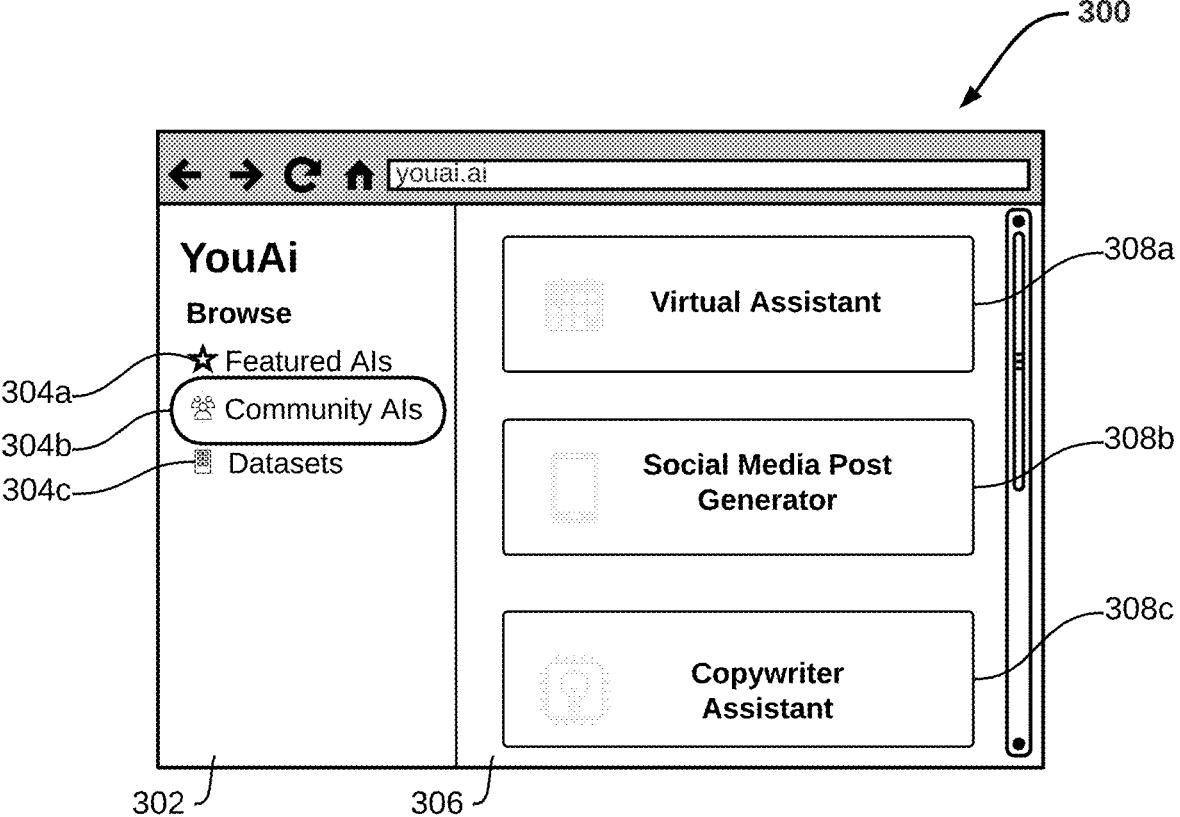
FIG. 3 illustrates a user interface, in accordance with one or more implementations.

FIG. 3 illustrates a user interface 300 that may be used by a system to refine machine learning models based on user responses to prompts. User interface 300 may include a first portion 302, a second portion 306, and/or other portions. First portion 302 may include one or more interface elements 304*a-c* that are selectable by the user. Selection of individual ones of the interface elements 304*a-c* may facilitate modifications to displays in second portion 306. By way of non-limiting illustration, second portion 306 includes a display associated with selection of interface element 304*b*. Second portion 306 may display a selection interface, responsive to selection of interface element 304*b*. The selection interface may include one or more of a first interface element 308*a*, a second interface element 308*b*, a third interface element 308*c*, and/or other interface elements. The interface elements included in the selection interface may be selectable by the user. Individual ones of the interface elements included in the selection interface may correspond to applications. For example, first interface element 308*a* may correspond with a first application ("Virtual Assistant), second interface element 308*b* may correspond with a second application ("Social Media Post Generator"), third interface element 308*c* may correspond with a third application ("Copywriter Assistant"), and so on and so forth. The individual applications associated with the interface elements may perform different tasks and/or functions. Selection of an individual interface element may facilitate use of the corresponding application by the user.

Figure 4A:
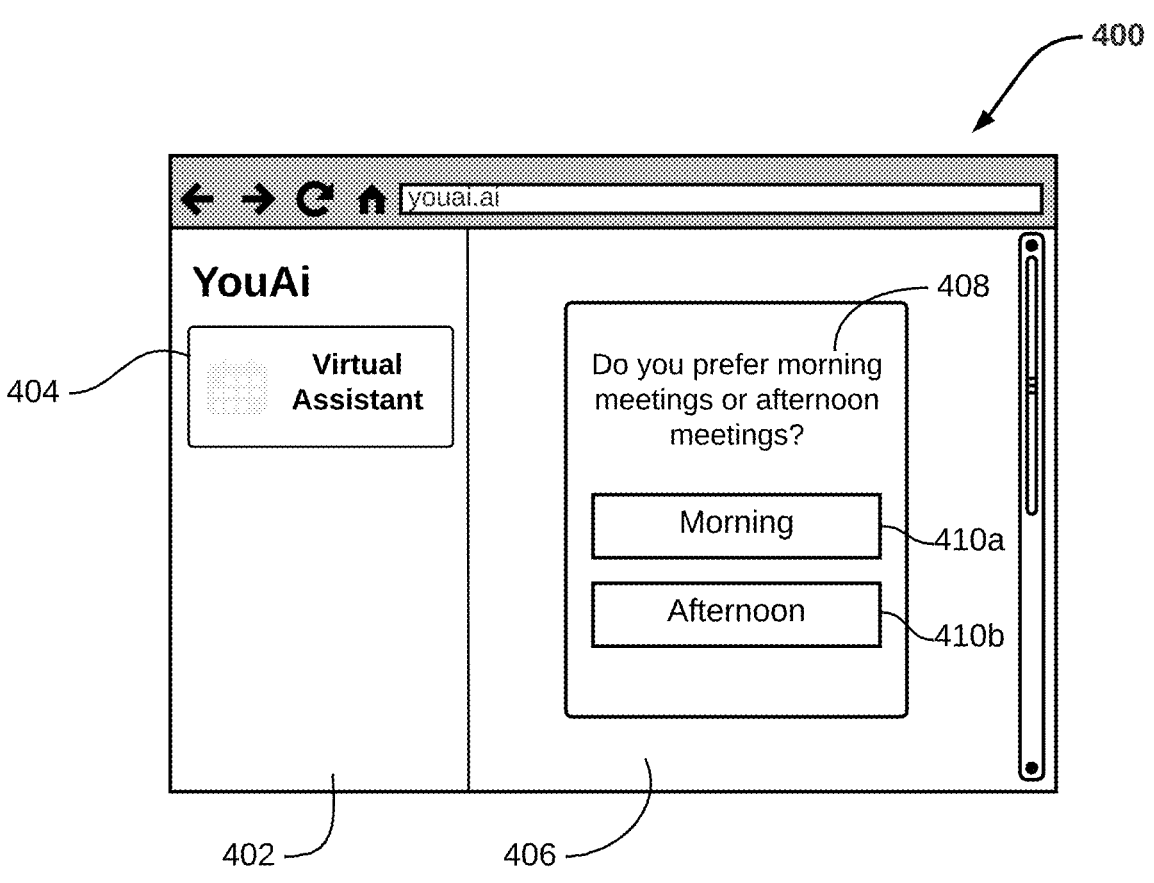
FIGS. 4A-B illustrate a user interface, in accordance with one or more implementations.
Figure 4B:
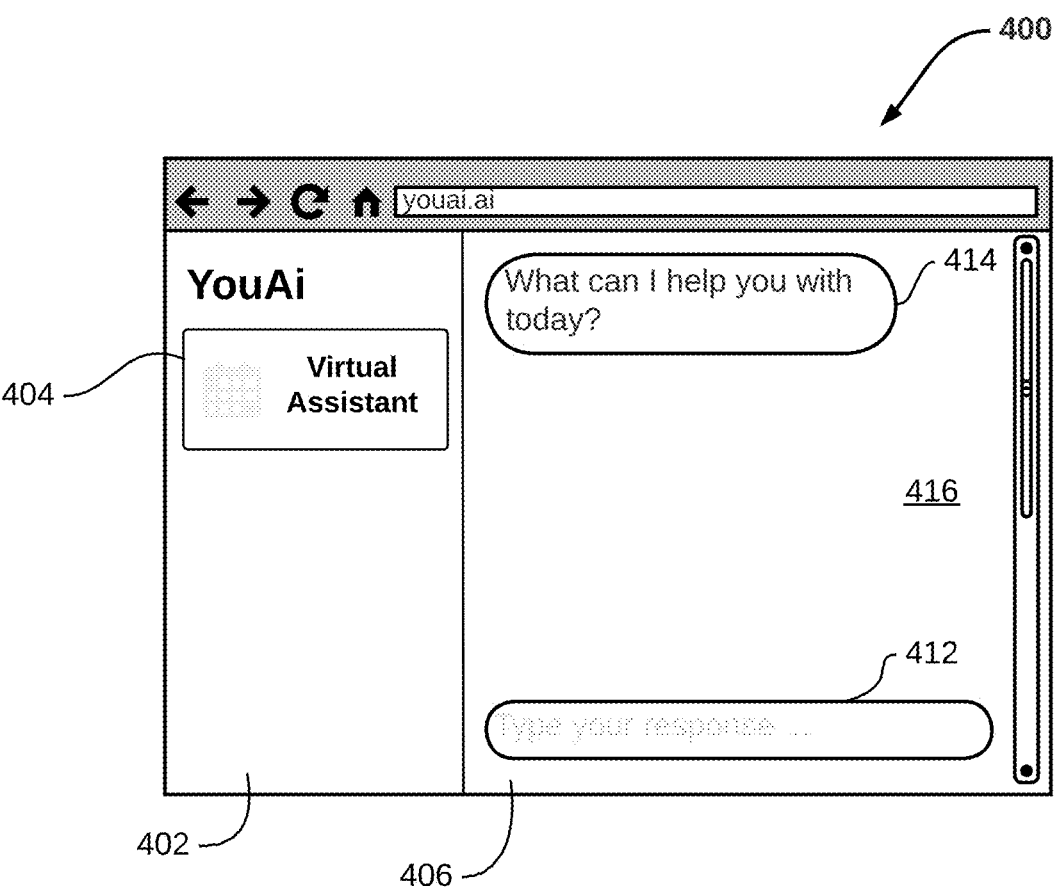

FIGS. 4A-B illustrate a user interface 400 that may be used by a system to refine machine learning models based on user responses to prompts. Referring to FIG. 4A, user interface 400 may include a first portion 402, a second portion 406, and/or other portions. First portion 402 may include a first interface element 404. First interface element 404 may indicate and/or be associated with a first application. User interface 400 includes a display that may be presented responsive to selection of an interface element corresponding with the first application (e.g., from a selection interface the same as or similar to the selection interface shown in FIG. 3). Second portion 406 may present one or more supplemental prompts associated with the first application. The one or more supplemental prompts may include a first supplemental prompt 408. First supplemental prompt 408 may be presented to a user via second portion 406. Second portion 406 may further include a second interface element 410*a*, a third interface element 410*b*, and/or other interface elements. Second interface element 410*a* may correspond with a first response option to first supplemental prompt 408. Third interface element 410*b* may correspond with a second response option to first supplemental prompt 408. Second interface element 410*a* and third interface element 410*b* may be selectable by the user. Selection of one of the interface elements 410*a-b* may indicate a response by the user to first supplemental prompt 408.

Referring to FIG. 4B, second portion 406 may include a display 416. Display 416 may facilitate use of the first application by the user. The first application may utilize one or more models to perform application functions. The one or more models may be refined for the user (i.e., based on response(s) to supplemental prompt(s), a response record for the user, and/or other information). Display 416 may be presented on second portion 406 responsive to a response by the user to the supplemental prompt 408. The first application may utilize an interactive language model configured to receive input and generate output based on the input. Display 416 may include a first display element 414 corresponding to a first output generated by the interactive language model. Display 416 may include a second display element 412 for receiving user input. The user input may be provided as input to the interactive language model to generate output.

Figure 5:
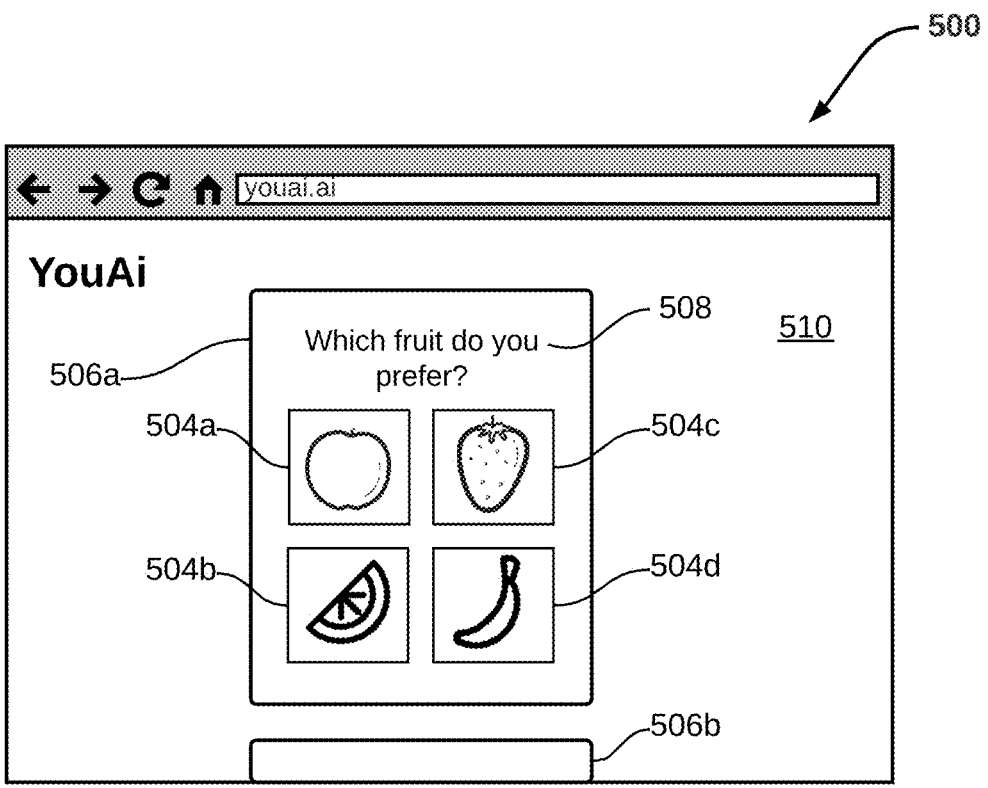
FIG. 5 illustrates a user interface, in accordance with one or more implementations.

FIG. 5 illustrates a user interface 500 that may be used by a system to refine machine learning models based on user responses to prompts. User interface 500 may include a scrollable feed 510. Scrollable feed 510 may present individual displays of a series of displays. The series of displays may include a first display 506*a*, a second display 506*b*, and/or other displays. First display 506*a* may include a first prompt 508. First display 506*a* may further include a first button 504*a*, a second button 504*b*, a third button 504*c*, a fourth button 504*d*, and/or other user interface elements. Individual ones of buttons 504*a-d* may correspond to individual response options to first prompt 508. For example, first button 504*a* may correspond to a first response option, second button 504*b* may correspond to a second response option, and so on and so forth. In some implementations, user input selecting a response option (e.g., selection of one or more buttons 504*a-d*) may facilitate presentation of second display 506*b*. In some implementations, second display 506*b* may be presented responsive to user input indicating skipping first prompt 508 (e.g., swiping from the bottom to the top of user interface 500).

Figure 6:
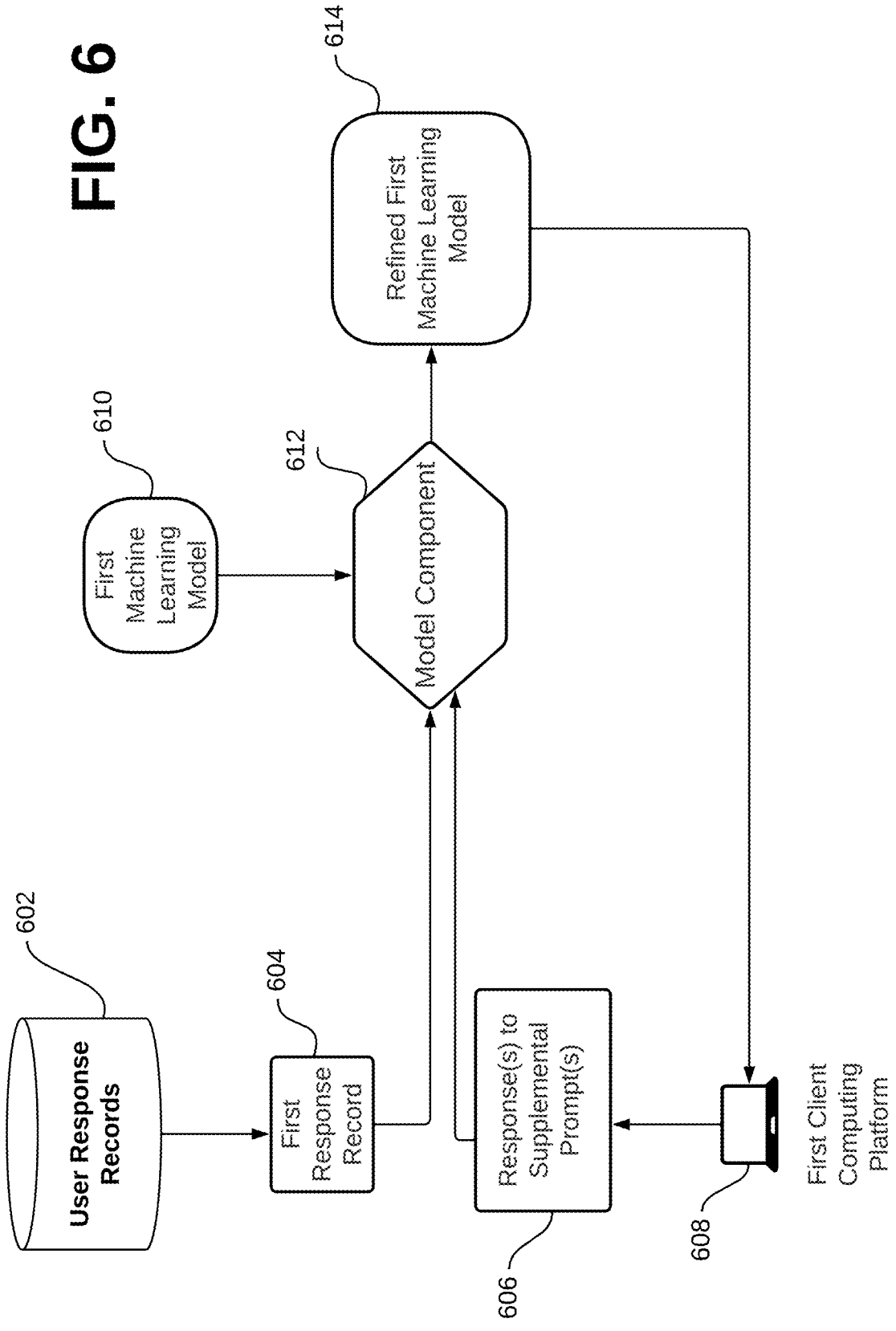
FIG. 6 illustrates an exemplary implementation of a system for refining machine learning models based on user responses to prompts.

FIG. 6 illustrates an exemplary implementation of a system to refine machine learning models based on user responses to prompt. The system may include a database of user response records 602 (e.g., the same as or similar to electronic storage 128). The database may store user response records for individual users including a first response record 604. First response record 604 may include responses provided by a first user to one or more prompts. The first user may provide response(s) to one or more supplemental prompts 606 via a first client computing platform 608 associated with the first user. First client computing platform may be the same as or similar to client computing platform(s) 104. The supplemental prompts may be provided to the first user responsive to selection of a first application. In some implementations, the supplemental prompts provided to the first user may be associated with the first application. The first application may utilize a first machine learning model 610 and/or other models to perform application functions. Model component 612 may be configured to refine the first machine learning model 610 based on the first response record 604 for the first user, response(s) to the supplemental prompts 606 by the first user, and/or other information. Model component 612 may be the same as or similar to model component 112. In some implementations, refining the first machine learning model 610 may include modifying the first machine learning model 610 to generate a refined first machine learning model 614. The refined first machine learning model 614 may be provided to the first user (e.g., via first client computing platform 608).

In some implementations, server(s) 102, client computing platform(s) 104, and/or external resources 126 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 126 may be operatively linked via some other communication media.

A given client computing platform 104 may include one or more processors configured to execute computer program components. The computer program components may be configured to enable an expert or user corresponding to the given client computing platform 104 to interface with system 100 and/or external resources 126, and/or provide other functionality attributed herein to client computing platform(s) 104. By way of non-limiting example, the given client computing platform 104 may include one or more of a desktop computer, a laptop computer, a handheld computer, a tablet computing platform, a Smartphone, and/or other computing platforms.

External resources 126 may include sources of information outside of system 100, external entities participating with system 100, and/or other resources. In some implementations, some or all of the functionality attributed herein to external resources 126 may be provided by resources included in system 100.

Server(s) 102 may include electronic storage 128, one or more processors 130, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 128 may comprise non-transitory storage media that electronically stores information. The electronic storage media of electronic storage 128 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 128 may include one or more virtual storage resources (e.g., cloud storage, a virtual private network, and/or other virtual storage resources). Electronic storage 128 may store software algorithms, information determined by processor(s) 130, information received from server(s) 102, information received from client computing platform(s) 104, and/or other information that enables server(s) 102 to function as described herein.

Processor(s) 130 may be configured to provide information processing capabilities in server(s) 102. As such, processor(s) 130 may include one or more of a digital processor, an analog processor, a digital circuit designed to process information, an analog circuit designed to process information, a state machine, and/or other mechanisms for electronically processing information. Although processor(s) 130 is shown in FIG. 1 as a single entity, this is for illustrative purposes only. In some implementations, processor(s) 130 may include a plurality of processing units. These processing units may be physically located within the same device, or processor(s) 130 may represent processing functionality of a plurality of devices operating in coordination. Processor(s) 130 may be configured to execute components 108, 110, and/or 112, and/or other components. Processor(s) 130 may be configured to execute components 108, 110, and/or 112, and/or other components by software; hardware; firmware; some combination of software, hardware, and/or firmware; and/or other mechanisms for configuring processing capabilities on processor(s) 130. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, and/or 112 are illustrated in FIG. 1 as being implemented within a single processing unit, in implementations in which processor(s) 130 includes multiple processing units, one or more of components 108, 110, and/or 112 may be implemented remotely from the other components. The description of the functionality provided by the different components 108, 110, and/or 112 described below is for illustrative purposes, and is not intended to be limiting, as any of components 108, 110, and/or 112 may provide more or less functionality than is described. For example, one or more of components 108, 110, and/or 112 may be eliminated, and some or all of its functionality may be provided by other ones of components 108, 110, and/or 112. As another example, processor(s) 130 may be configured to execute one or more additional components that may perform some or all of the functionality attributed below to one of components 108, 110, 112, 114, and/or 116.

Figure 2:
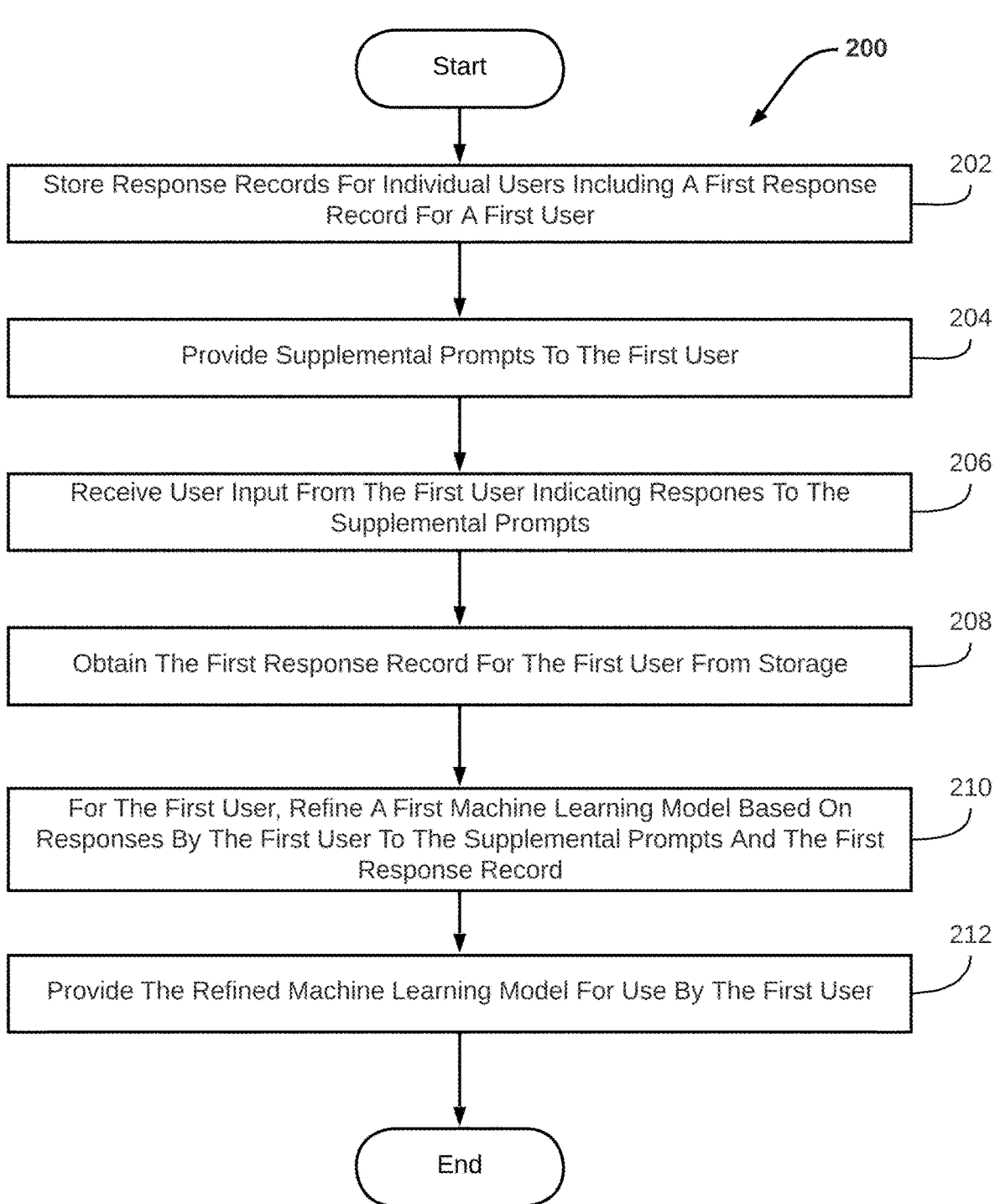
FIG. 2 illustrates a method for refining machine learning models based on user responses to prompts, in accordance with one or more implementations.

FIG. 2 illustrates a method 200 for refining machine learning models based on user responses to prompts, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include storing response records for individual users. Response records for individual ones of the users may include responses by individual ones of the users to prompts. Prompts may be provided via user interfaces of client computing platforms associated with individual ones of the users. By way of non-limiting illustration, the response records may include a first response record for a first user. The first response record may include responses provided by the first user to prompts. Operation 202 may be performed by one or more components that is the same as or similar to electronic storage 128, in accordance with one or more implementations.

An operation 204 may include providing supplemental prompts to the first user. The supplemental prompts may be provided on a user interface of a client computing platform associated with the first user. The supplemental prompts may include a first supplemental prompt that is presented to the first user. Operation 204 may be performed by one or more hardware processors configured by machine-readable instructions including a component that is the same as or similar to prompt component 108, in accordance with one or more implementations.

An operation 206 may include receiving user input from the first user indicating responses to the supplemental prompts. The user input may indicate a first response to the first supplemental prompt. Operation 206 may be performed by one or more hardware processors configured by machine-readable instructions including a component that is the same as or similar to prompt component 108, in accordance with one or more implementations.

An operation 208 may include obtaining the first response record for the first user from storage. Operation 208 may be performed by one or more hardware processors configured by machine-readable instructions including a component that is the same as or similar to record component 110, in accordance with one or more implementations.

An operation 210 may include refining, for the first user, a first machine learning model based on response(s) by the first user to the supplemental prompts and/or the first response record. Refining the first machine learning model may include training the first machine learning model to customize outputs generate by the model for the first user.

Operation 210 may be performed by one or more hardware processors configured by machine-readable instructions including a component that is the same as or similar to model component 112, in accordance with one or more implementations.

An operation 212 may include providing the refined machine learning model for user by the first user. Operation 212 may be performed by one or more hardware processors configured by machine-readable instructions including a component that is the same as or similar to model component 112, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed:

1. A system configured to refine machine learning models based on user responses from users to prompts, such that the machine learning models as refined generate customized outputs that are specific per user, the system comprising:

electronic storage that stores individual response records associated with individual ones of the users, wherein an individual response record associated with an individual user includes content selected and/or entered by the individual user as sets of responses by the individual user in response to prompts that were previously provided to the individual user, wherein the prompts are provided via a user interface of a client computing platform associated with the individual user, such that the response records include a first response record associated with a first user, the first response record including content selected and/or entered by the first user as a first set of responses provided by the first user in response to prompts that were previously provided to the first user;

one or more physical processors configured by machine-readable instructions to:

provide supplemental prompts to the first user, wherein the supplemental prompts are provided on a user interface of a client computing platform associated with the first user, wherein the supplemental prompts include a first supplemental prompt that is presented to the first user, and wherein the supplemental prompts are associated with a first machine learning model;

receive user input from the first user indicating responses to the supplemental prompts, wherein the user input indicates a first response to the first supplemental prompt, wherein the first response includes content selected and/or entered by the first user in response to the first supplemental prompt, and wherein the user input is received through the user interface on the client computing platform;

obtain the first response record for the first user from the electronic storage;

for the first user, refine the first machine learning model based on the responses by the first user to the supplemental prompts and further based on the first response record, wherein refining includes training the first machine learning model on training information to customize outputs generated by the first machine learning model to be specific for the first user, and wherein the training information includes the responses by the first user to the supplemental prompts and the first set of responses included in the first response record; and provide, via the client computing platform associated with the first user, the refined machine learning model for use by the first user.

2. The system of claim 1, wherein the one or more physical processors are further configured by machine-readable instructions to:

present a selection interface to the first user, wherein the selection interface includes one or more selectable interface elements corresponding to individual applications, wherein individual ones of the applications utilize one or more models to perform application functions; and receive, via user input from the first user, selection of a first application that utilizes the first machine learning model.

3. The system of claim 2, wherein the supplemental prompts are provided to the first user responsive to selection of the first application, wherein selection of the first application facilitates use of the first application by the first user, and wherein the supplemental prompts provided to the first user are associated with the first application.

4. The system of claim 1, wherein the first machine learning model is a publicly available model or a private model.

5. The system of claim 1, wherein the first prompt includes one or more of text content, audio content, and/or visual content.

6. The system of claim 1, wherein the one or more physical processors are further configured by machine-readable instructions to:

present a scrollable feed to a given user on a user interface of a client computing platform associated with the given user, wherein the scrollable feed presents individual displays of a series of displays, wherein individual displays include individual prompts, and wherein user input facilitates presentation of a subsequent display within the series of displays, such that a first display including a first prompt is presented to the given user, and responsive to user input, a second display including a second prompt is presented to the given user;

obtain, based on user input via the client computing platform associated with the given user, a set of user responses to the prompts included in the individual displays presented on the scrollable feed.

7. The system of claim 6, wherein the one or more physical processors are further configured by machine-readable instructions to:

aggregate the obtained set of user responses by the given user to generate a response record for the given user; and store the response record for the given user.

8. The system of claim 6, wherein the one or more physical processors are further configured by machine-readable instructions to:

update a response record for the given user, responsive to receipt of the set of user responses by the given user to the prompts included in the individual displays of the scrollable feed, wherein the response record for the given user is stored in electronic storage.

9. The system of claim 1, wherein refining the first machine learning model includes modifying a context window corresponding to the first machine learning model, wherein modifying the context window includes modifying the size of inputs capable of being processed by the first machine learning model.

10. A method for refining machine learning models based on user responses from users to prompts, such that the machine learning models as refined generate customized outputs that are specific per user, the method comprising:

storing, in electronic storage, individual response records associated with individual ones of the users, wherein an individual response record associated with an individual user includes content selected and/or entered by the individual user as sets of responses by the individual user in response to prompts that were previously provided to the individual user, wherein the prompts are provided via user interfaces of a client computing platforms associated with the individual user, wherein storing includes storing a first response record associated with a first user, the first response record including content selected and/or entered by the first user as a first set of responses provided by the first user in response to prompts that were previously provided to the first user;

providing supplemental prompts to the first user, wherein the supplemental prompts are provided on a user interface of a client computing platform associated with the first user, including providing a first supplemental prompt to the first user, and wherein the supplemental prompts are associated with a first machine learning model;

receiving user input from the first user indicating responses to the supplemental prompts, including receiving user input that indicates a first response to the first supplemental prompt, wherein the first response includes content selected and/or entered by the first user in response to the first supplemental prompt, and wherein the user input is received through the user interface on the client computing platform;

obtaining the first response record for the first user from the electronic storage;

for the first user, refining the first machine learning model based on the responses by the first user to the supplemental prompts and further based on the first response record, wherein refining includes training the first machine learning model on training information to customize outputs generated by the first machine learning model to be specific for the first user, and wherein the training information includes the responses by the first user to the supplemental prompts and the first set of responses included in the first response record; and providing the refined machine learning model for use by the first user.

11. The method of claim 10, wherein the method further comprises:

presenting a selection interface to the first user, wherein the selection interface includes one or more selectable interface elements corresponding to individual applications, wherein individual ones of the applications utilize one or more models to perform application functions; and receiving, via user input from the first user, selection of a first application that utilizes the first machine learning model.

12. The method of claim 11, wherein the supplemental prompts are provided to the first user responsive to selection of the first application, wherein selection of the first application facilitates use of the first application by the first user, and wherein the supplemental prompts provided to the first user are associated with the first application.

13. The method of claim 10, wherein the first machine learning model is a publicly available model or a private model.

14. The method of claim 10, wherein the first prompt includes one or more of text content, audio content, and/or visual content.

15. The method of claim 10, wherein the method further comprises:

presenting a scrollable feed to a given user on a user interface of a client computing platform associated with the given user, wherein the scrollable feed presents individual displays of a series of displays, wherein individual displays include individual prompts, and wherein user input facilitates presentation of a subsequent display within the series of displays, including presenting a first display including a first prompt to the given user, and responsive to user input, presenting a second display including a second prompt to the given user;

obtaining, based on user input via the client computing platform associated with the given user, a set of user responses to the prompts included in the individual displays presented on the scrollable feed.

16. The method of claim 15, wherein the method further comprises:

aggregating the obtained set of user responses by the given user to generate a response record for the given user; and storing the response record for the given user.

17. The method of claim 15, wherein the method further comprises:

updating a response record for the given user, responsive to receipt of the set of user responses by the given user to the prompts included in the individual displays of the scrollable feed.

18. The method of claim 10, wherein refining the first machine learning model includes modifying a context window corresponding to the first machine learning model, wherein modifying the context window includes modifying the size of inputs capable of being processed by the first machine learning model.

* * * * *